(12) United States Patent
Tohyama et al.

(10) Patent No.: US 6,816,613 B2
(45) Date of Patent: Nov. 9, 2004

(54) COLOR IMAGE PROCESSING APPARATUS CAPABLE OF REPRODUCING COLORS WITH HIGH-FIDELITY VISUALLY

(75) Inventors: Daisetsu Tohyama, Toyokawa (JP); Hiroyuki Suzuki, Toyokawa (JP); Makoto Kumagai, Toyokawa (JP); Atsushi Ishikawa, Anjo (JP)

(73) Assignee: Minolta Co., Ltd., Osaka (JP)

( * ) Notice: Subject to any disclaimer, the term of this patent is extended or adjusted under 35 U.S.C. 154(b) by 550 days.

(21) Appl. No.: 09/774,680

(22) Filed: Feb. 1, 2001

(65) Prior Publication Data
US 2001/0012399 A1 Aug. 9, 2001

(30) Foreign Application Priority Data
Feb. 3, 2000 (JP) .................................... 2000-025892
Nov. 29, 2000 (JP) .................................... 2000-363635

(51) Int. Cl.$^7$ ................................................ G06K 9/00
(52) U.S. Cl. ................ 382/167; 382/164; 382/171; 382/174
(58) Field of Search .............................. 382/162–165, 382/167, 171, 174, 312, 324; 358/518–522; 348/649, 650; 345/589–591

(56) References Cited

U.S. PATENT DOCUMENTS

| | | | | | |
|---|---|---|---|---|---|
| 5,475,492 | A | * | 12/1995 | Yukawa | 356/401 |
| 5,835,244 | A | * | 11/1998 | Bestmann | 358/523 |
| 6,148,092 | A | * | 11/2000 | Qian | 382/118 |
| 6,272,239 | B1 | * | 8/2001 | Colla et al. | 382/167 |
| 6,400,371 | B1 | * | 6/2002 | Helman et al. | 345/589 |
| 6,633,655 | B1 | * | 10/2003 | Hong et al. | 382/118 |
| 2003/0133044 | A1 | * | 7/2003 | Akiyama et al. | 348/586 |

* cited by examiner

*Primary Examiner*—Bhavesh M. Mehta
*Assistant Examiner*—Yubin Hung
(74) *Attorney, Agent, or Firm*—Morrison & Foerster LLP

(57) ABSTRACT

A color image processing apparatus extracts foreground image data and background image data from whole image data, and corrects one or more among hue, value and chroma of the foreground image data based on one or more among hue, value and chroma of the background image data, thereby reproducing colors by means of correcting a color contrast phenomenon that appearances of the image change in response to an image of the background image data, and allowing color reproduction with high fidelity visually.

18 Claims, 15 Drawing Sheets

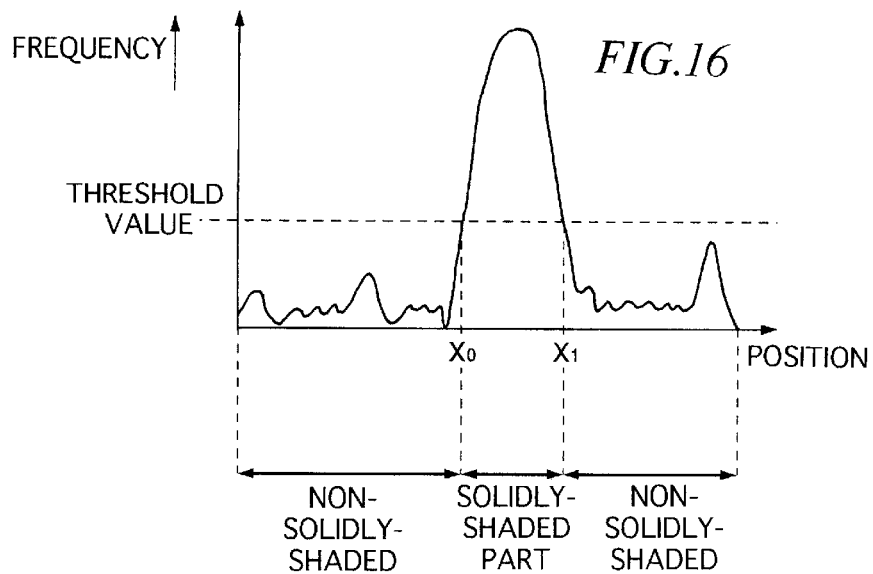
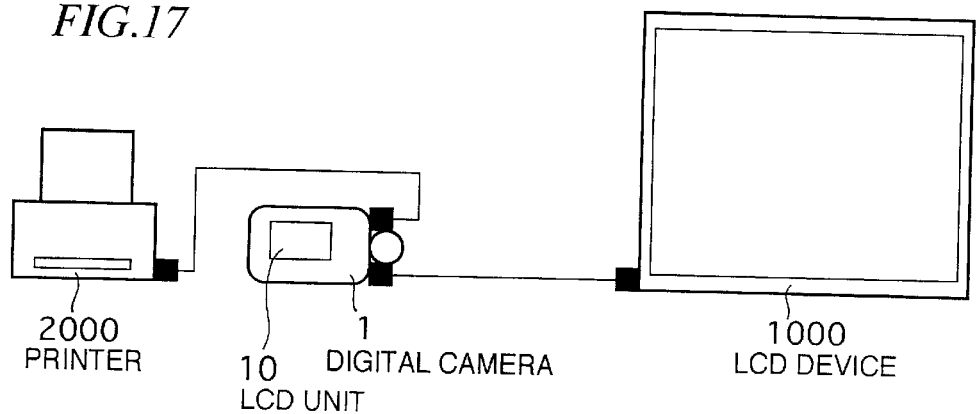

COLOR IMAGE PROCESSING APPARATUS CAPABLE OF REPRODUCING COLORS WITH HIGH-FIDELITY VISUALLY

This application is based on Japanese Patent applications Nos. 2000-25892 and 2000-363635 filed in Japan, the contents of which are hereby incorporated by reference.

BACKGROUND OF THE INVENTION

This invention relates generally to an image forming apparatus such as a digital copier apparatus, printer and the like, and to a digital image photographing apparatus such as a digital camera, and further relates to a color image processing apparatus for correcting colors of image data in consideration of visual characteristics of human beings.

There have conventionally been provided with various correcting methods for reproducing input color images with high fidelity in the above-mentioned image processing apparatus. For example, Japanese patent application publication No. 9-270932 discloses a method of correcting color image data by setting masking coefficients for image reproduction in response to colors of recording media (such as paper) to be used, thereby reproducing a color image with high fidelity even if paper including various colors is used. Further, in order to solve a problem that, even if color printed matter and a color monitor image have an equal color in a color space under certain ambient light, both of appearances of these images change according to changes in the ambient light, Japanese patent application publication No. 9-102882 discloses a method of detecting information about the ambient light and converting colors to be reproduced according to the ambient light.

However, the above conventional arts have not disclosed a correcting method in consideration of visual characteristics of human beings. For example, even if color image data is captured by a color scanner or a camera with high accuracy, and reproduced with high fidelity in response to a paper color or ambient light, it has been impossible to correct the difference in an appearance of color due to visual characteristics of human beings. That is, the conventional arts could not have coped with a problem that the appearance of the foreground in an image changes in response to the background. The phenomenon of changes in the appearance of the color is generally called as a contrast phenomenon wherein, as to hue, the hue of the foreground appears to wear complementary color of the background color, wherein as to brightness value (hereinafter simply referred to as value), the foreground appears to be dark in a light background color, and wherein, as to chroma, the foreground appears to be darkish in the vivid background color. Due to this phenomenon of changes in the appearances of the color, for example, as shown in FIGS. 13(a) and 13(b) in which a man (foreground) appears in the vivid blue of the sea, or green of the grass (background), skin of the man appears to be yellowish in the blue of the sea, and appears to be reddish in the green of the grass.

SUMMARY OF THE INVENTION

This invention is made to solve the above-mentioned problems. One object of the present invention is to provide a color image processing apparatus which is capable of correcting changes in colors (contrast phenomenon) of a foreground image caused by a background image due to visual characteristics of human beings, thereby visually reproducing the colors with high fidelity.

In order to achieve the above-mentioned object, according to one aspect of the present invention, a color image processing apparatus which carries out processing for correcting input color image data, comprises: an extracting device for extracting foreground image data and background image data from the input color image data; a detecting device for detecting one or more among hue, value and chroma of the background image data extracted by the extracting device; and a correcting device for correcting one or more among hue, value and chroma of the foreground image data based on one or more among the hue, value and chroma detected by the detecting device.

According to another aspect of the present invention, in the color image processing apparatus, the correcting device corrects one or more among the hue, value and chroma of the foreground color in a direction of color difference of the background color.

According to a further aspect of the present invention in the image processing apparatus, the correcting device carries out the correction when an area composed of the foreground color and background color exceeds a predetermined extent, and does not carry out the correction when the area is smaller than or equal to the predetermined extent.

According to a further aspect of the present invention in the image processing apparatus, the correcting device corrects a color contrast phenomenon that occurs visually.

According to a further aspect of the present invention in the image processing apparatus, the correcting device corrects the one or more among the hue, value and chroma of the foreground color in a reverse to a direction from an actual color difference to a visual color difference by a difference between the actual color difference and the visual color difference.

According to a further aspect of the present invention in the image processing apparatus, the extracting device includes a generator of a histogram about the one or more among the hue, value and chroma of a subject image, wherein, based on the histogram created by the histogram generator, each of frequency histograms about the one or more among the hue, value and chroma is created in X and Y directions, wherein, based on the frequency histograms, addresses about the one or more among the hue, value and chroma distributed in X and Y directions are obtained, and the maximum and minimum addresses are obtained, and wherein, if the maximum and minimum addresses are the same hue (value or chroma), the image having said hue is decided to be a background image, whereas if there is any hue (value or chroma) included in the maximum and minimum addresses, the image having said hue (value or chroma) is decided to be a foreground image.

BRIEF DESCRIPTION OF THE DRAWINGS

FIG. 13(a) is a view showing a case in which a man (foreground) appears in the blue of the sea (background), whereas

FIG. 16 is a view explaining a method of judging solidly-shaded imaged.

FIG. 17 is a view showing an entire structure of an image display system of a digital camera according to another embodiment of the present invention.

DETAILED DESCRIPTION OF THE PREFERRED EMBODIMENT OF THE PRESENT INVENTION

Figure 1:
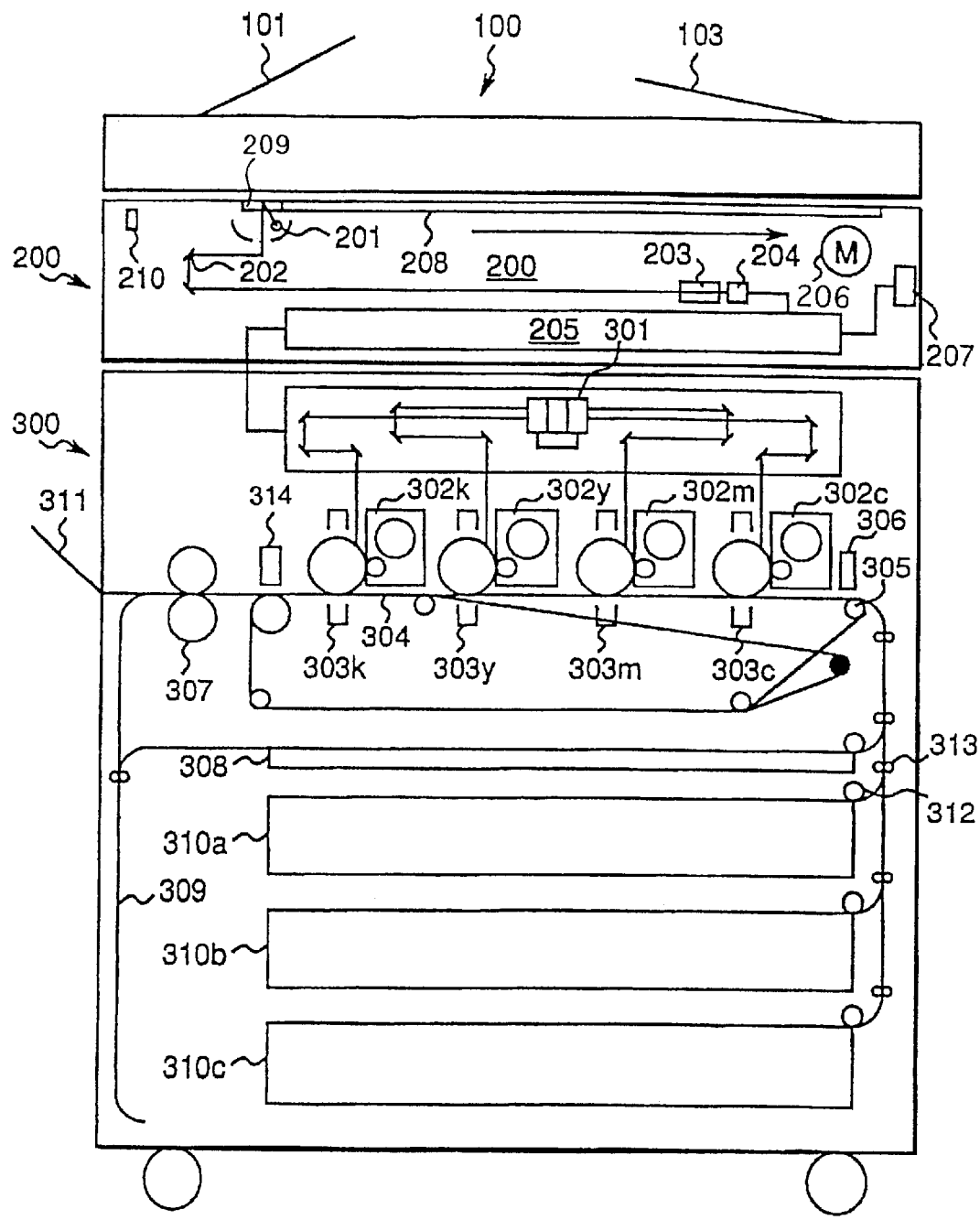
FIG. 1 is a view showing an entire structure of a color digital copier apparatus according to one embodiment of the present invention.

Now, the first embodiment of the present invention will be explained with reference to the drawings. It is to be noted that the same or similar components are denoted by the same reference numerals in the drawings. FIG. 1 shows an entire structure of a color digital copier apparatus. Said copier apparatus comprises an automatic document feeder 100, an image reading unit 200 and an image forming unit 300 in a tandem system. The copier apparatus is capable of simultaneously outputting four colors in one scanning operation, and normally makes the image reading unit 200 read out a document that is conveyed to an image reading position by the automatic document feeder 100, and then, transfers read-out image data to the image forming unit 300 for forming an image (copier function). Besides, the apparatus is capable of being connected with an external device through an interface 207, which makes it possible to output the image data read out by the image reading unit 200 to the external device (image reading function), and conversely, to form an image of image data that is received from the external device by transmitting the data to the image forming unit 300.

The automatic document feeder 100 is nextly explained. The automatic document feeder 100 conveys the document that is set in a document setting tray 101 to the image reading position of the image reading unit 200, and discharges the document into the document discharge tray 103 after terminating an image reading operation. The feeder 100 carries out the document conveyance operation according to an instruction from an operation panel (not shown in the figure), and carries out the document discharge operation according to a reading termination signal from the image reading unit 200. If plural documents are set, these control signals are continuously produced to thereby efficiently perform the operations of document conveyance, reading, and document discharge.

Next, as to the image reading unit 200, light reflected from the document on a document glass 208, illuminated by an exposure lamp 201 is guided by a three-mirror (first, second and third mirrors) group 202 into a lens 203, and then imaged in a CCD sensor 204. The exposure lamp 201 and first mirror can scan an entire surface of the document on the document glass 208 with travelling at a speed of V in response to a magnification in a direction shown by an arrow by a scanner motor 206. Besides, with the scanning of the exposure lamp 201 and first mirror, the second and third mirrors also scan in the same direction at a speed of V/2. A position of the exposure lamp 201 is calculated and controlled with a scanner home sensor 210 and a travelling amount (number of steps of the motor) from a home position thereof. The reflected light from the document, incident into the CCD sensor 204 is converted into an electrical signal in the sensor, and then, an image processing circuit 205 performs analog processing, A/D (analog-to-digital) processing, digital image processing on the electrical signal. After that, the electrical signal is transmitted to the interface 207 and image forming unit 300. Besides the document reading position on the document glass 208, the image reading unit 200 includes a white shading correction board 209, thereby reading the shading correction board 209 in order to prepare correction data for shading correction prior to reading of an image on the document.

Next, the image forming unit 300 in a tandem system is explained. Exposure and imaging operations are first described. The image data transmitted from the image reading unit 200 or interface 207 is converted into print data composed of cyan (C), magenta (M), yellow (Y) and black (K), and transmitted to each of exposure head controllers (not shown). Each of the exposure head controllers emits laser light in response to the transmitted electrical signal of the image data, and performs one-dimensional scanning of the light through a polygonal mirror 301 to thereby expose a photoconductor of each of imaging units 302c, 302m, 302y and 302k that are placed in a line along the paper conveyance direction of a sheet conveyer belt 304. Each of the imaging units 302c, 302m, 302y and 302k includes elements required for performing electrophotography processes around the photoconductor. Each of photoconductors for C, M, Y and K turns in a clockwise direction to thereby continuously perform each of image forming processes. These imaging units required for image forming operations are united in each of processes, and formed in detachable/attachable structures from/to an apparatus body. A latent image on the photoconductor in each of the imaging units is developed by each of color developing devices. A toner image on the photoconductor is transferred onto a sheet on the sheet conveyer belt 304 by transfer chargers 303c, 303m, 303y and 303k that are placed facing toward the above photoconductors in the sheet conveyer belt 304.

Next, paper feeding, paper conveyance and fixing operations are explained. The sheet to which the image is transferred, is fed to a transferring position in a following sequence, and the image is formed on the sheet. Sheets of different sizes are set in a group of paper feed cassettes 310a, 310b and 310c, and a sheet of a desired size is fed to a conveyance path by a paper feed roller 312. The sheet that is fed to the conveyance path is conveyed to the sheet conveyer belt 304 by a conveyance roller 313, where a timing sensor 306 detects a reference mark on the sheet conveyer belt 304, and controls conveyance timing of the paper to be conveyed. Further, the image forming unit 300 is provided with three register correction sensors 314 in a line (main scanning direction) vertical to the conveyance direction of the belt 304 in the most downstream side of the imaging unit. After a resist pattern on the sheet conveyer belt 304 is formed, said sensors detect the amount of displacement of colors in the main and sub scanning direction in the image of C, M, Y and K, and a print imaging controller (PIC) corrects an image position and an image distortion, thereby preventing the displacement of the colors in the image of C, M, Y and K. Then, the toner image that is transferred on the sheet is heated and melted by a pair of fixing rollers 307, thereby fixed on the sheet, and after that, the sheet with the image is discharged to the discharge tray 311.

In the case of a double-sided copying operation, in order to form an image on the underside of a sheet, the sheet on which toner is fixed by the pair of the rollers 307, is reversed by a sheet reversing unit 309, and guided by a double-side unit 308, then re-supplied from the double-side unit. It should be noted that the sheet conveyer belt 304 can escape from each of imaging units of C, M, Y and K by a movement of a belt escaping roller 305 to thereby bring a non-contact state between the sheet conveyer belt 304 and the photoconductor. Therefore, each of imaging units of C, M and Y can be stopped to drive in the case of forming monochrome images, which makes it possible to decrease friction of photoconductor or its peripheral processes.

Figure 2:
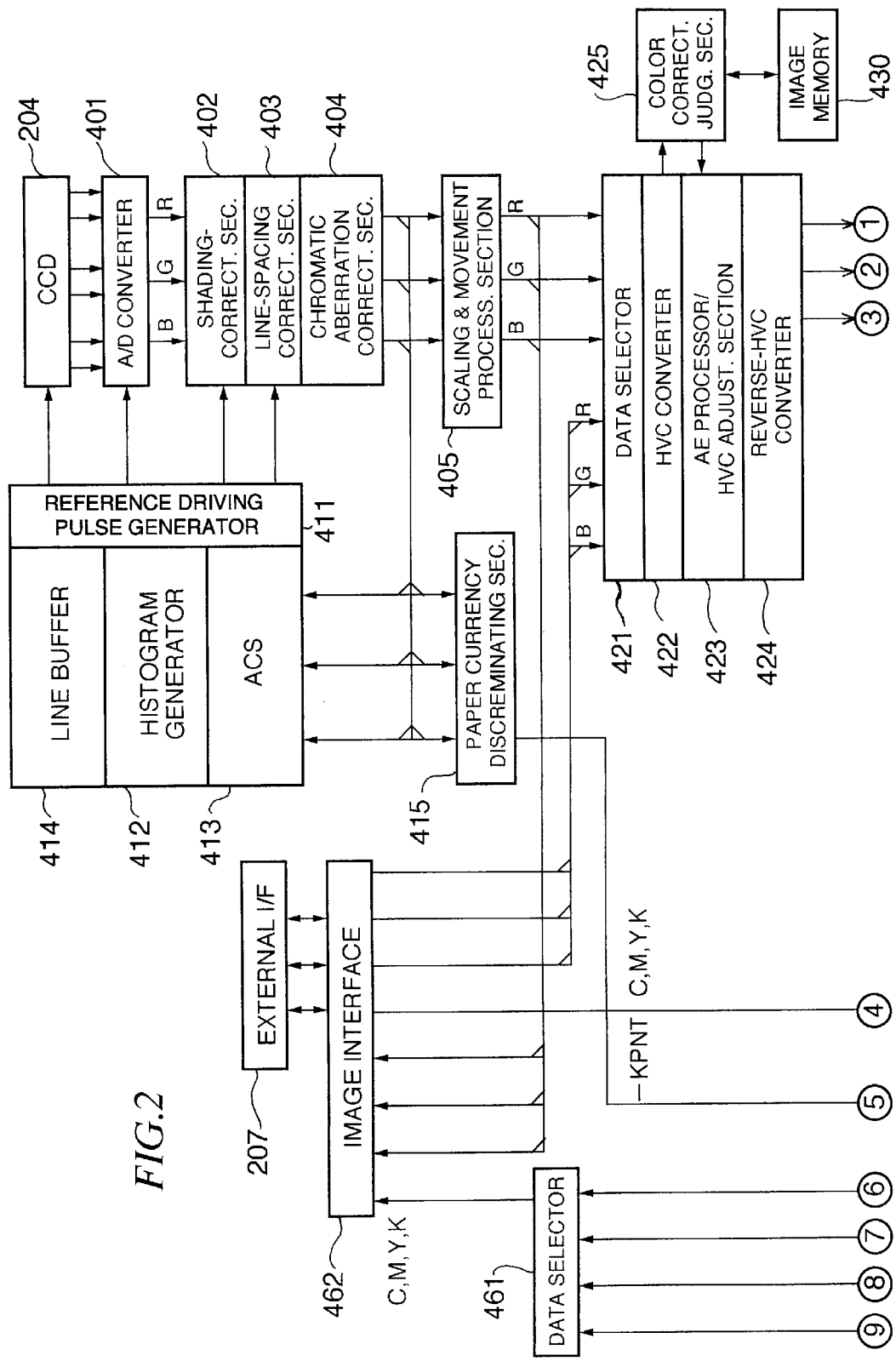
FIG. 2 is a block diagram of an image processing unit of an image reading unit according to one embodiment of the present invention.
Figure 3:
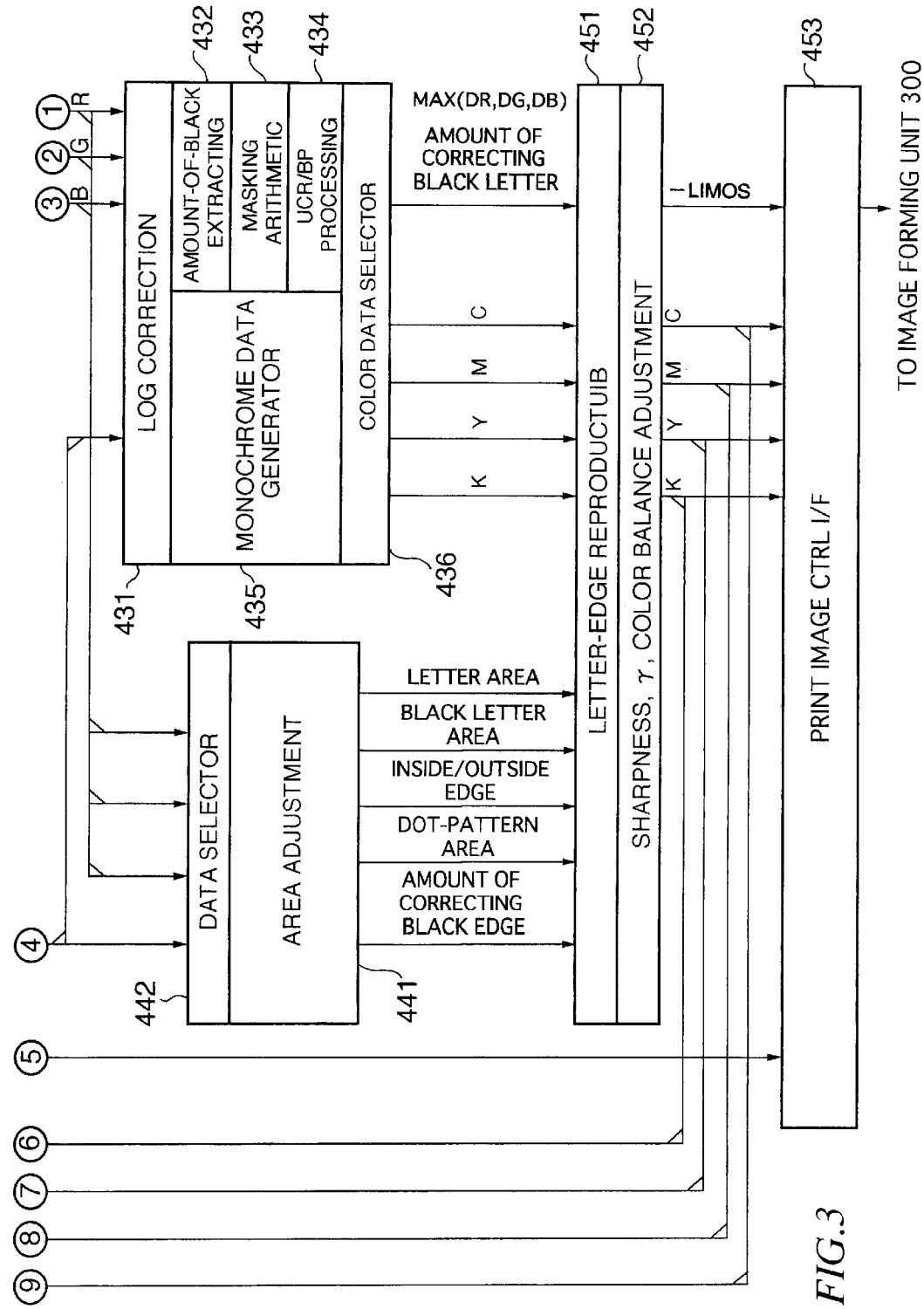
FIG. 3 is a block diagram of an image processing unit of an image reading unit according to one embodiment of the present invention.

Next, signal processing of the image reader 200 is explained. FIGS. 2 and 3 are entire block diagrams of the image processing circuit 205 in the image reading unit 200. The image reading unit 200 images the light reflected from the document surface into the CCD sensor 204 by a reduced optical unit, thereby obtaining an analog signal that was photoelectrically converted into resolving information about each of colors of R, G and B. An A/D (analog-to-digital) converter section 401 converts image data of 400 dpi that was photoelectrically converted by the CCD sensor 204, into digital data of 8 bits (256 levels of gray) for each of R, G and B color information through an A/D converter. A shading correcting section 402, in order to eliminate inconsistencies in colors of R, G and B data in the main scanning direction, stores data that is obtained by reading out the white shading correction board 209 in a shading memory thereof as reference data for each of R, G and B before the document reading operation, then reciprocally converts in the document scanning operation, and multiplies it by read-out data of the document information, thereby making corrections.

A line-spacing correcting section 403 carries out delay control on data of each of colors in a line-by-line basis through a field memory thereof in response to a scanning speed (depending on a sub-scanning magnification) for adjusting the reading position in the scanning direction of each of R, G and B sensor chips. Phase difference in reading between R, G and B increases with getting closer to end parts of the document in the main scanning direction due to chromatic aberration that is created by the optical lens. This causes misjudgments in later-described ACS judgment or black-letter judgment as well as the displacement of colors. For this reason, the phase difference between R, G and B are corrected based on chroma information by a chromatic aberration correcting section 404.

A scaling and movement processing section 405, employing two scaling line memories for each of R, G and B data, alternately inputs and outputs every one line, and independently controls a timing of writing and reading, thereby performing scaling and movement processing in the main scanning direction; that is, the scaling and movement processing section 405 thins out data in a writing operation into the memory to thereby execute reduction of the scaling, and pads data in a reading operation out of the memory, to thereby execute magnification of the scaling. In this control, the scaling and movement processing section 405 carries out interpolation processing before the writing operation into the memory in the reduction, and carries out it after the reading operation out of the memory in the magnification in response to the scaling ratio, thereby preventing deficiencies or unevenness in images. The combination of the control on this block and the scanning control performs operations for centering, image-repeating, continuous photographing of magnified images, reduction of binding margins, and the like, as well as the reduction and magnification of the scaling.

A histogram generator 412 generates value data based on R, G and B data that was obtained by a sub-scanning operation, and produces its histogram on a memory (histogram memory), whereas it judges whether every one dot is a color dot or not, based on chroma data, and produces the number of color dots on a memory (ACS memory) for every one mesh of a 512-dot square on the document. Based on this result, an automatic color selector (ACS) 413 carries out an automatic control of a copy ground level (AE processing), and makes an automatic color selection (ACS processing) between a color-copying operation and a monochrome-copying operation.

A line buffer 414, which has a memory capable of storing one line of R, G and B data that were read out by the image reading unit 200, can monitor image data for analyzing images in order to automatically correct sensitivity of the CCD sensor and correct clamps in the A/D converter 401. Further, a paper currency discriminating section 415 always extracts an area of R, G and B data, and discriminates for judging whether the document is paper currency or not by means of pattern matching. If the paper currency discriminator 415 judges the document to be paper currency, the CPU for controlling the reading operation of the image reading unit 200 and image processor unit 205 output a solidly-shading signal (−PNT="L") to a print-imaging controller side for changing K-data into a solid shade in the print-imaging controller side, to thereby disable a normal copying operation.

Figure 4:
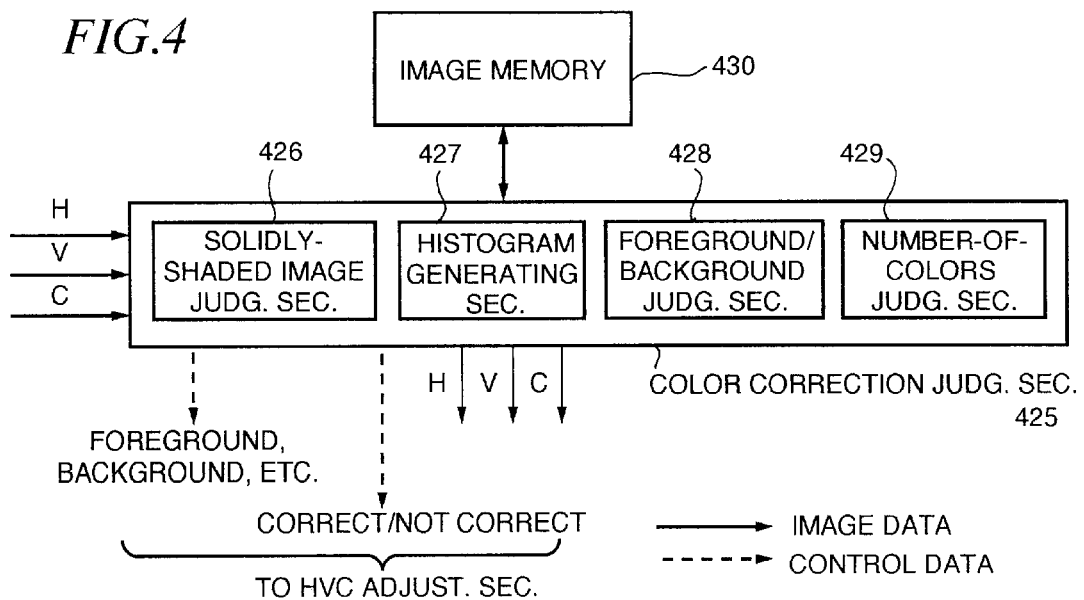
FIG. 4 is a block structural view of a color correction judgment section according to one embodiment of the present invention.

An HVC converter 422 temporally converts R, G and B data that were input through a data selector 421 into color difference signals (Cr and Cb data) composed of hue, value and chroma by matrix arithmetic of 3*3. Then, the HVC converter 422 corrects V-data based on a ground level control value that was written in advance by an AE processor 423, and corrects the Cr and Cb data in response to a chroma level and a hue level that were set on an operation panel. After that, a reverse-HVC converter 424 executes reverse-matrix arithmetic of 3*3, to thereby re-convert into R, G and B data. Besides, a color correction judgment unit (details are illustrated in FIG. 4) 425 is connected to the HVC converter 422 and AE processor 423, and also connected with an image memory 430.

A LOG correcting section 431 converts each of the R, G and B data into density data (DR, DG and DB data), and after that, an amount-of-black extracting section 432 detects the minimum color level of the DR, DG and DB data as a document under-color element, and simultaneously detects a difference in a gradation between the maximum color and minimum color in the R, G and B data as document chroma data. The DR, DG and DB data are converted into color data (C, M, Y and K data) that match color toner of a printer by non-linear matrix arithmetic of 3*6 in a masking arithmetic section 433.

An under-color removing and black print processor (UCR/BP processor) 434 calculates UCR/BP coefficients corresponding to document chroma data for the above-described document under-color element (Min (R, G and B)), to thereby determine amounts of UCR/BP by multiplying processing, and subtracts an amount of under-color removing (amount of UCR) from the C, M and Y data that were already processed by masking arithmetic, to thereby calculate C, M and Y data, and calculate data about the amount of BP=K. Further, a monochrome data generator 435 creates value elements based on R, G and B data, carries out the LOG correction to thereby output it as black data (DV data). Finally, a color data selector 436 selects C, M, Y and K data as a color copy image, and DV data as a monochrome copy image.

An area judgment section 441 detects a difference (Max (R, G, B)−Min(R, G, B)) between the minimum color (Min(R, G, B)) and the maximum color based on R, G and B data that were input through a data selector 442, to thereby perform judgments of black letters, color letters, dot patterns and the like. Further, the area judgment section 441 carries out a letter-edge correction in the black letter judgment, and transfers it together with the judgment result to a letter-edge reproducing section 451. At the same time, the area judgment section 441 prepares and transmits an attribute signal for changing a gradation-reproducing method to a print-imaging controller side and a print head controller side.

The letter-edge reproducing section 451 carries out correction processing (edge emphasis, smoothing, and letter-edge removing) on C, M, Y and K data transmitted from a color data selector 436, in correspondence with each of judgment areas based on the area judgment result. Lastly, a sharpness, gamma and color balance adjusting section 452 carries out image corrections on C, M, Y and K data in response to sharpness, color balance and gamma levels that are specified on the operation panel, and transfers a gradation reproduction attribute signal −LIMOS to a print image control interface 453, and transmits the C, M, Y, and K data to an image interface 462 through the data selector 461.

The gradation-reproduction attribute signal −LIMOS is transferred with the image data of C, M, Y and K in order to automatically change gradation-reproduction processing in a print-imaging controller and gradation-reproduction periodicity in a print-head controller. The signal reaches an "L" level in an area (a non-dot-pattern, letter-edge and edge-inside-letter area), and directs the gradation-reproduction processing that gives a higher priority to resolution, and has no unevenness in letter edges. While the gradation-reproduction processing in the print-imaging controller executes processing of dummy 256 levels of gradation which is normally called as dispersion of errors in multiple values, a letter edge section corresponding to −LIMOS="L" executes simple quantization processing for preventing unevenness in letter edges.

While reproduction in 2-dot pulse width modulation that is set in a screen square of normally 45° is executed in the print-head controller in the image forming unit 300, reproduction in 1-dot pulse width modulation that gives higher priority to the resolution is executed in the area corresponding to −LIMOS="L". It should be noted that the graduation reproduction periodicity in the print-head controller is changed over in boundary parts in letter edges by changing over the processing for inside edges in the letter edges, which makes density jump (due to difference in gamma characteristics) unnoticeable. As to the image interface 462, it inputs and outputs the images from and to the external device, and its operations are capable of simultaneously inputting and outputting R, G and B data, and sequentially inputting and outputting C, M, Y, and K data, whereas the external device is capable of using the color copier apparatus as a scanner or print function.

FIG. 4 shows a block diagram of said color correction judgment section 425. The color correction judgment section 425 comprises a solidly-shaded image judgment section 426 for judging solidly-shaded parts, a histogram generator 427 (detector), a foreground/background judgment section 428 (extracting device) and a number-of-colors determining section 429. The input image data is temporally stored in the image memory 430 for various judgment processing. After the processing in the color correction judgment section 425, image data H, V and C, and control data are transmitted from the color correction judgment section 425 to the HVC adjusting section 423. Based on this judgment result, the HVC adjusting section 423 (correcting device) corrects the image data so as to correct contrast phenomenon (such as hue contrast, value contrast, chroma contrast) that visually occurs. The control data includes signals indicating the necessity or non-necessity of the correction (1 bit), and signals indicating foreground, background and others (2 bits). It should be noted that the HVC adjusting section 423 executes processing for the above-mentioned color correction and said color correction of the contrast phenomenon.

Figure 5:
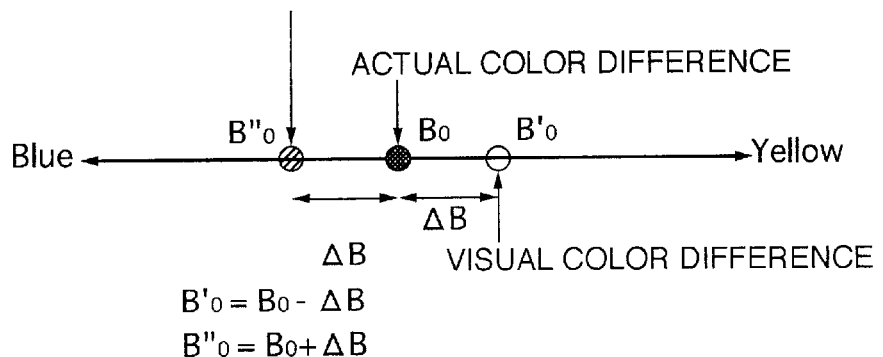
FIG. 5 is a view explaining a correcting method on a color difference axis of Y(yellow) and B(blue) a color difference axis of Y(yellow) and B(blue).

Nextly, the explanation is given to a method for correcting the contrast phenomenon that visually occurs. In this correcting method, the foreground image data and background image data are extracted from the image data, and, one or more of hue, value and chroma in the foreground image data are corrected in a direction of color difference of the background color. Besides, the contrast phenomenon is corrected in the case that an area of the foreground color and background color is larger than a predetermined area. FIG. 5 shows the correcting method on a color difference axis of Y(yellow) and B(blue). When an actual color difference is assumed to be B0, and a visual color difference be B0', the contrast is corrected in a reverse to a direction from the actual color difference to the visual color difference by a difference ΔB between them, thereby obtaining an output color difference B0" (after correction).

Figure 6A:
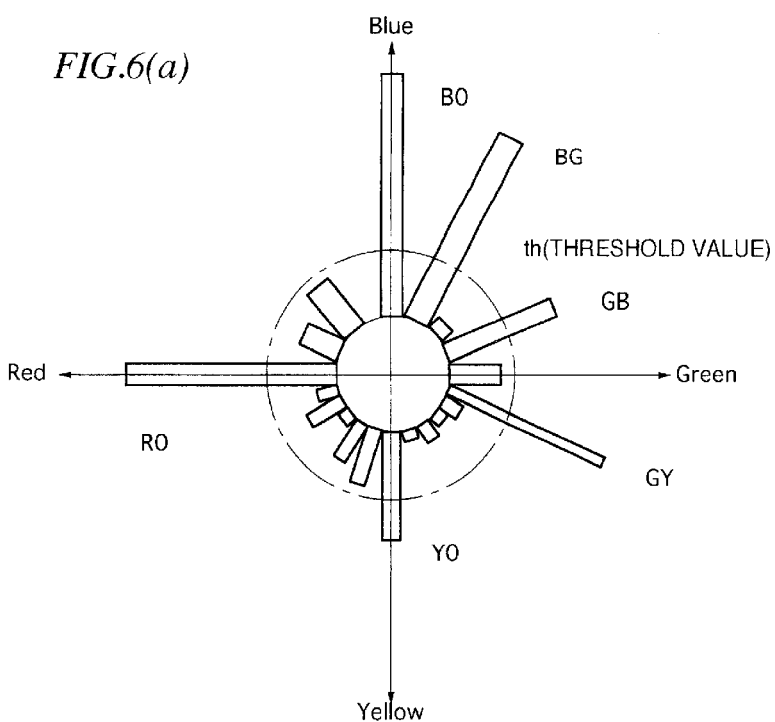
FIGS. 6(a), 6(b) and 6(c) are views showing examples of histograms of hue, value and chroma according to one embodiment of the present invention.
Figure 6B:
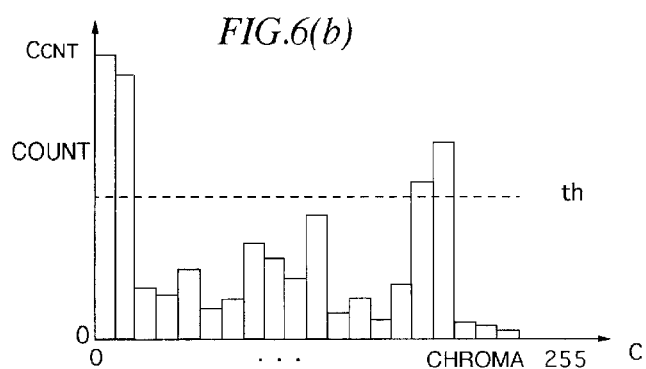
Figure 6C:
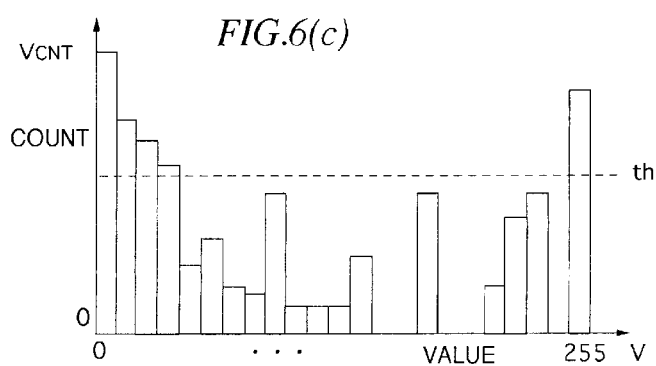

FIGS. 6(a), 6(b) and 6(c) indicate examples of histograms of hue, value and chroma that are created by the histogram generator 427. In the histograms, "th" indicates "threshold values" that are references for judging whether to correct or not. B0, BG, GB, GY, Y0 and R0 are hues over the threshold values, and used for later-described judgment of the foreground and background.

Figure 7:
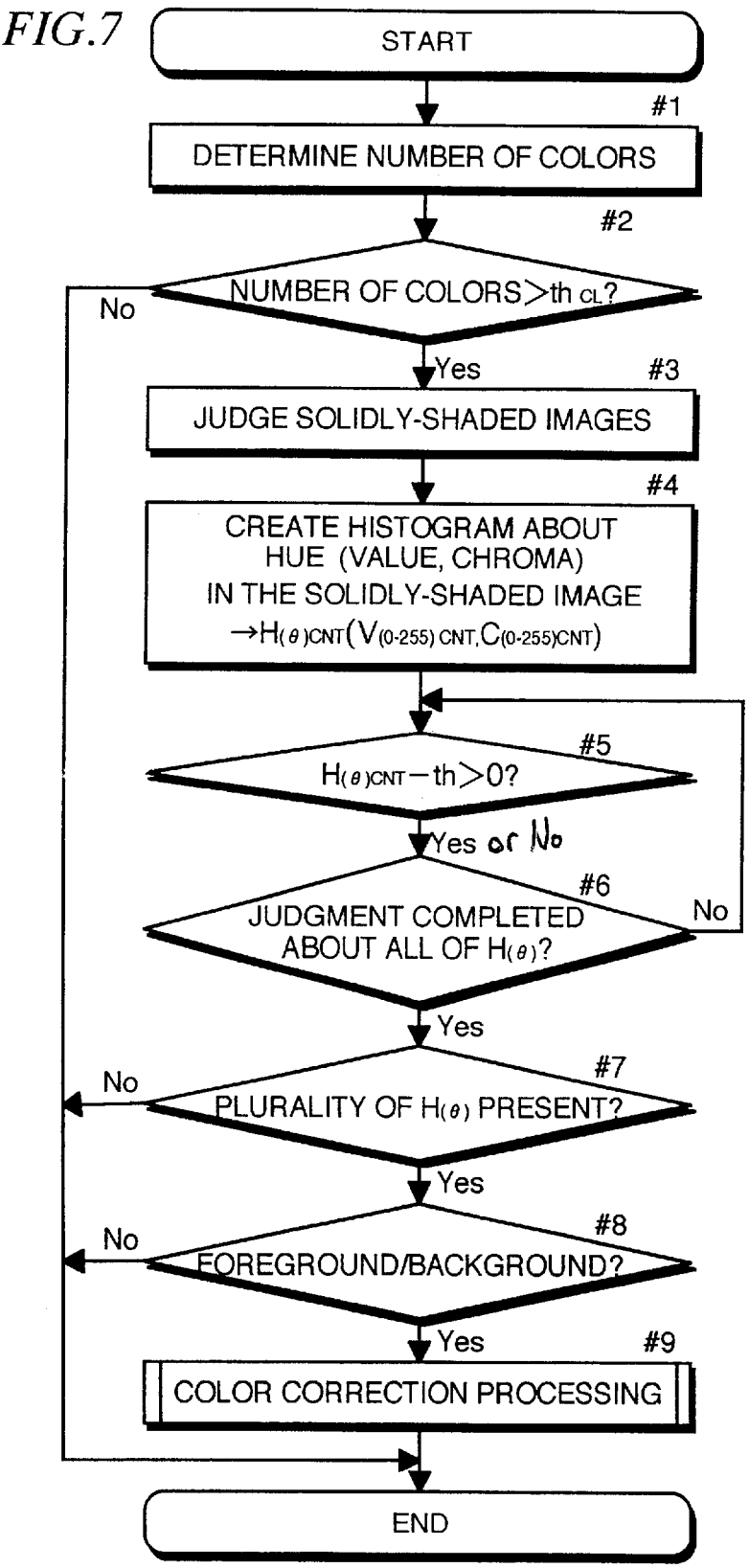
FIG. 7 is a flowchart showing a procedure of the correcting method according to one embodiment of the present invention.

FIG. 7 is a flowchart of a processing procedure for the above-mentioned correcting method. First of all, the number of colors is determined (#1), and it is judged whether the number of colors exceeds a threshold value $th_{CL}$ of full color (#2). If it is full color, the procedure goes to #3, but if not, this processing is not carried out. In #3, the judgment is made about solidly shaded images (the judgment method is later described in detail), and each of histograms are created about hue, value and chroma in the solidly shaded image part (#4). Each of histograms are represented as $H(\theta)_{CNT}$, $V(0-255)_{CNT}$ and $C(0-255)_{CNT}$ (CNT, which is a symbol for indicating a counted result, is distinguished from common H, V and C). After that, it is judged whether each of values exceeds the threshold value (th) (#5), the figure only refers to H(θ), but this is also executed for value and chroma. In the example shown in FIG. 6(a), B0, BG, GB, GY, Y0 and R0 are obtained, which indicates YES, and when the judgment is completed for the whole data (YES in #6), it is judged whether H(θ) or the like that exceeds the threshold value exists in plurality (#7), and if it is YES, it is judged whether they compose the foreground or background, or it belongs to another area that is not foreground nor background (#8, this judgment method is later described). If the result is YES, the color correction processing is executed (#9). If any of the judgment results in NO, this processing is not executed.

The above processing makes it possible to execute the correction when the area composed of the foreground and background is larger than the predetermined area (arbitrarily set), and not to execute the correction when it is smaller. Therefore, the correction is executed only in the case that the area composed of the foreground and background influences the visual characteristics of human beings, thereby preventing the degradation in the high-fidelity reproduction caused by the unwanted correction.

Figure 8:
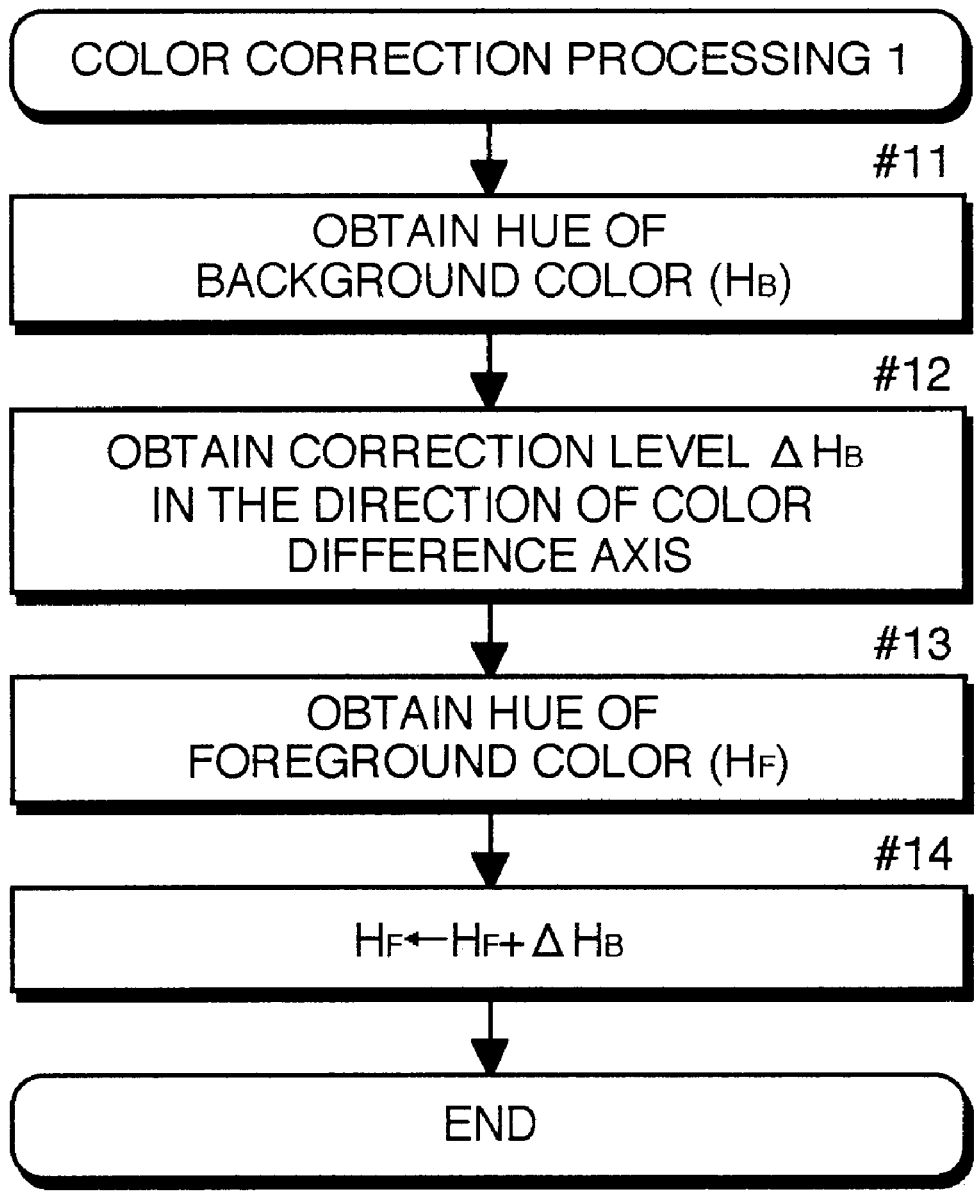
FIG. 8 is a flowchart showing a procedure of correcting hue according to one embodiment of the present invention.
Figure 9:
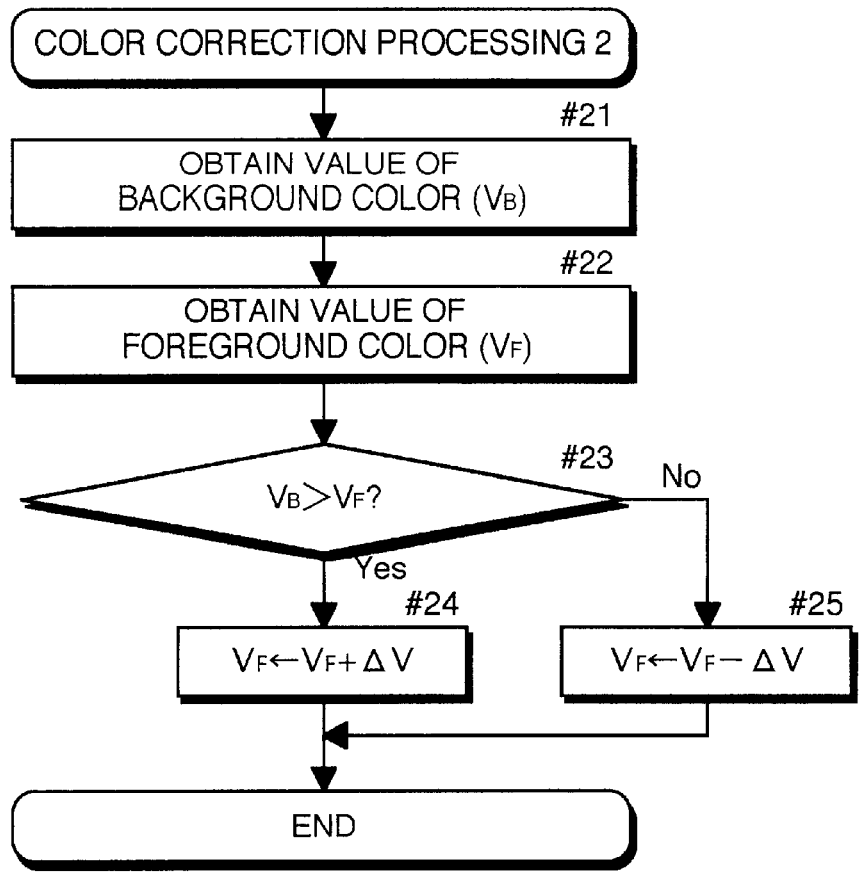
FIG. 9 is a flowchart showing a procedure of correcting value according to one embodiment of the present invention.
Figure 11:
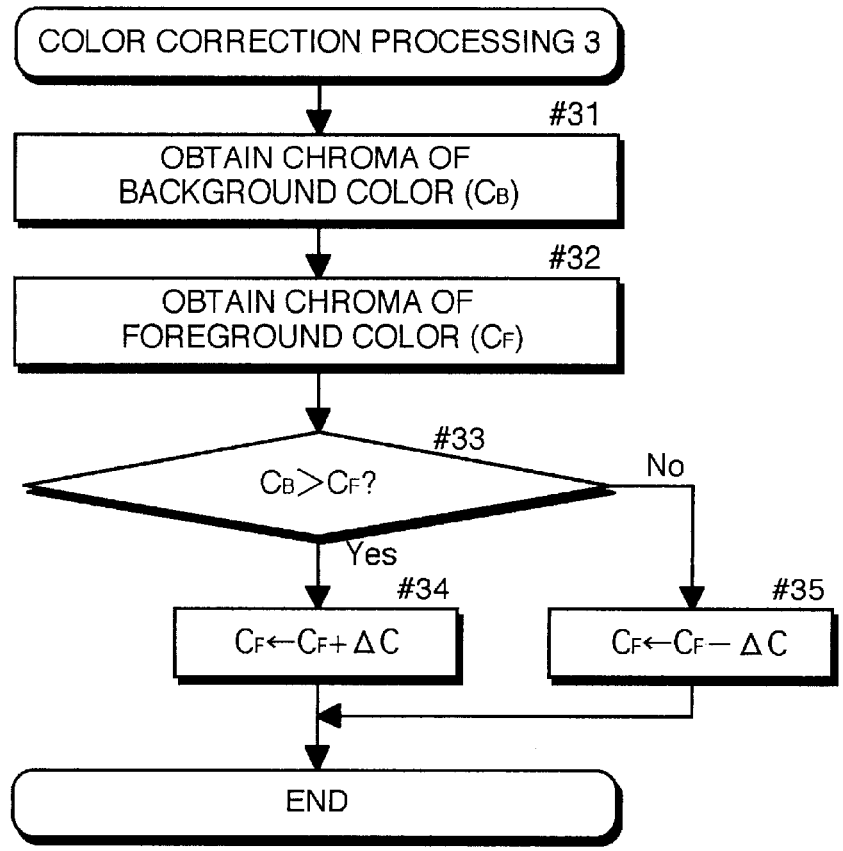
FIG. 11 is a flowchart showing a procedure of correcting chroma according to one embodiment of the present invention.

Various example of the above color correction processing is shown in FIGS. 8, 9 and 11. FIG. 8 shows a procedure of hue correction processing. In this processing, the hue of the background color ($H_B$) is first obtained (#11), then, the $H_B$ correction level $\Delta H_B$ in the direction of the color difference axis is obtained (#12). After that, the hue of the foreground color ($H_F$) is obtained (#13), and $H_F+\Delta H_B$ is decided to be new hue $H_F$ of the foreground color (#14). Without this correction processing, the foreground image data should visually have worn a color in a direction toward a complementary color of the background color (hue contrast phenomenon), but the color reproduction through this processing allows to offset said phenomenon, which gives no changes on appearances in colors, and makes it possible to produce high-fidelity colors.

FIG. 9 shows a procedure of value correction processing. In this processing, the value of the background color ($V_B$) is first obtained (#21), and the value of the foreground color ($V_F$) is secondly obtained (#22). Then, it is judged whether $V_B$ exceeds VF (#23). If it is YES, $V_F+\Delta V$ is decided to be new value $V_F$ (#24). If it is NO, $V_F-\Delta V$ is decided to be new value $V_F$ (#25). That is, while #24 indicates the case of increasing the value of the foreground color since the background color are brighter than that of the foreground color, #25 indicates the case of decreasing the value of the foreground color since the background color are less bright than that of the foreground color.

Figure 10:
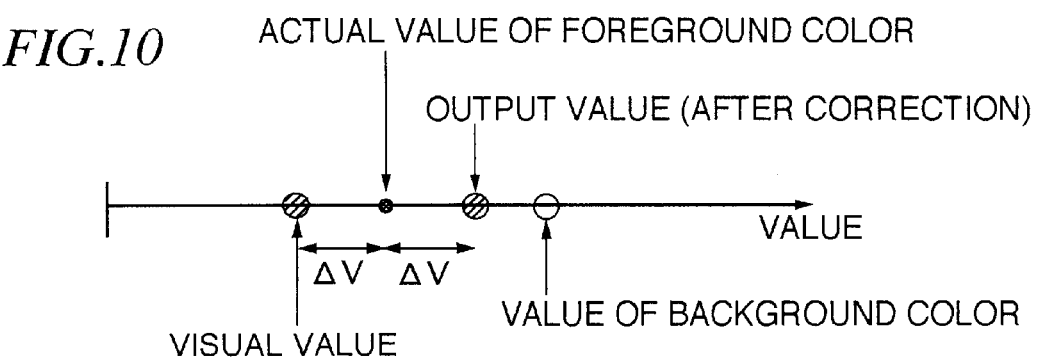
FIG. 10 is a view showing a method of correcting value according to one embodiment of the present invention.

FIG. 10 shows a method of said value correcting processing. When the actual value of the foreground color is lower than that of the background color, the visual value of the foreground color is less bright than the actual value (value contrast phenomenon). In this case, the output value of the foreground color is corrected so as to be brighter than the actual value of the foreground color. This correction allows the value contrast phenomenon to be suppressed. On the contrary, if the background color is less bright than the foreground color, since the foreground color is visually brighter than the actual brightness, the output value of the foreground color is corrected so as to be less bright than the actual value.

FIG. 11 shows a procedure of the chroma correcting processing. In this processing, the chroma of the background color ($C_B$) is first obtained (#31), and then the chroma of the foreground color ($C_F$) is obtained (#32). After that, it is judged whether $C_B$ exceeds $C_F$ (#33), and if it is YES, $C_F+\Delta C$ is decided to be new chroma $C_F$ of the foreground color (#34), whereas if it is NO, $C_F-\Delta C$ is decided to be the new chroma $C_F$ of the foreground color (#35). That is, while #34 indicates the case of increasing the chroma of the foreground color since the chroma of the background color is higher than that of the foreground color, #35 indicates the case of decreasing the chroma of the foreground color since the chroma of the background color is lower than that of the foreground.

Figure 12:
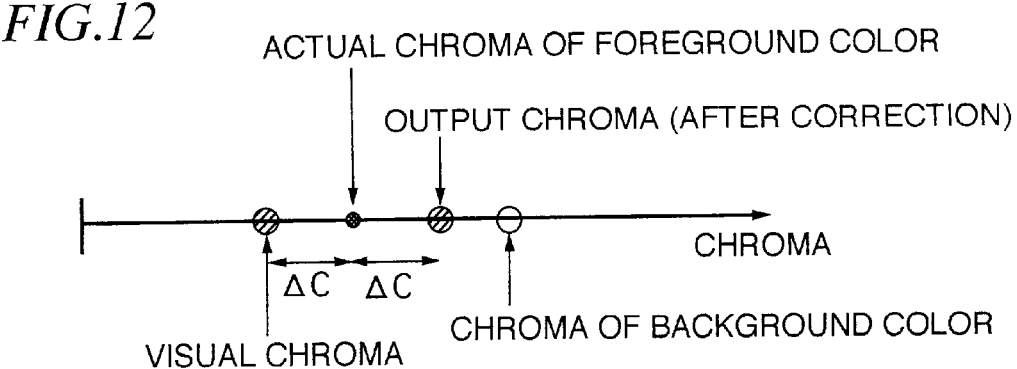
FIG. 12 is a view showing a method of correcting chroma according to one embodiment of the present invention.

FIG. 12 shows a method of said chroma correcting processing. When the actual chroma of the foreground color is lower than that of the background color, the visual chroma of the foreground color is lower than the actual chroma (chroma contrast phenomenon). In this case, the output chroma of the foreground color is corrected so as to be higher than the actual chroma of the foreground color. This correction allows the chroma contrast phenomenon to be suppressed. On the contrary, when the chroma of the background color is lower than that of the foreground color, since the chroma of the foreground color is visually higher than the actual chroma, the output chroma is corrected so as to be lower than the actual chroma.

Figure 13A:
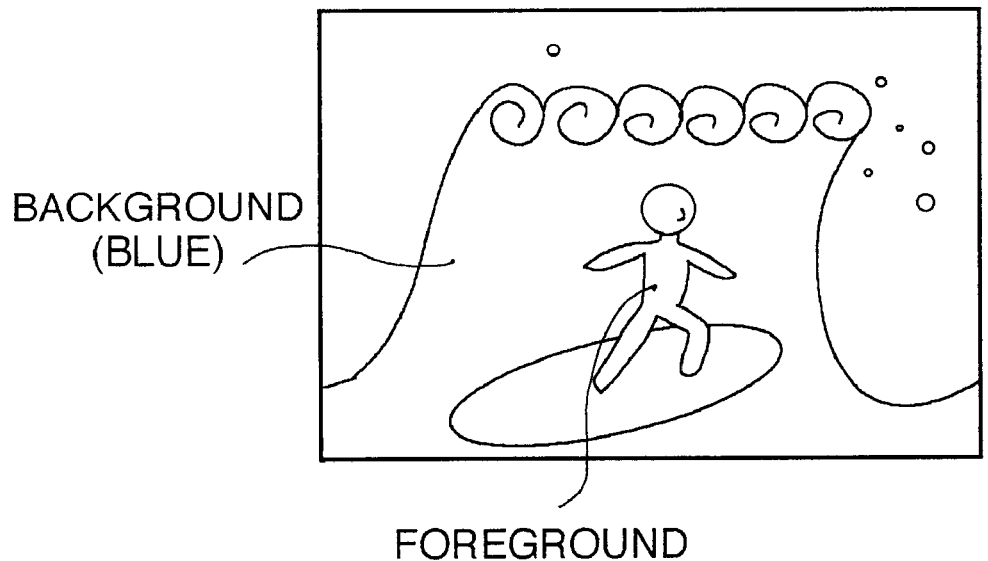
Figure 13B:
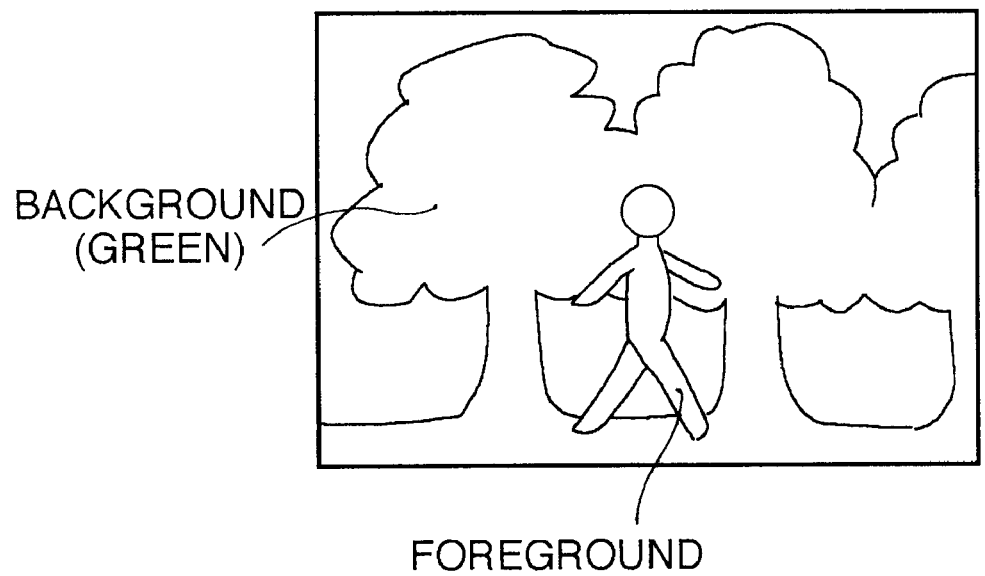
FIG. 13(b) is a view showing a case in which a man (foreground) appears in the green of the grass (background) according to one embodiment of the present invention.

As shown in the case of said FIGS. 13(a) and 13(b), for example, the above-described correction of the foreground color in response to the background color, can suppress the phenomenon that a human's skin appears yellowish in blue of the sea (background), or appears reddish in green of grass (background), thereby producing high-fidelity colors. It should be noted that, although various kinds of color correction processing is shown in the above description, there is no necessity to carry out all of the processing in combination, and it is also possible to carry out one correction or more appropriately according to conditions of images.

Figure 14:
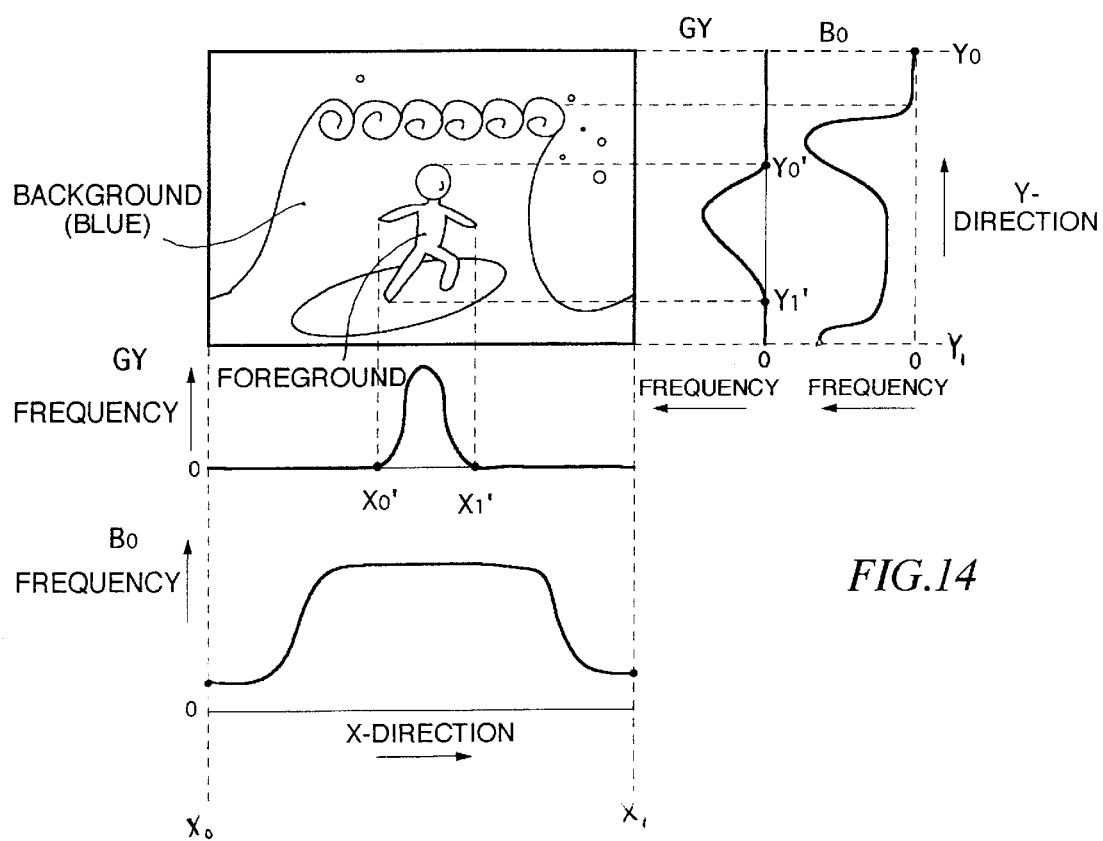
FIG. 14 is a view explaining a method of judging between the foreground and background.
Figure 15:
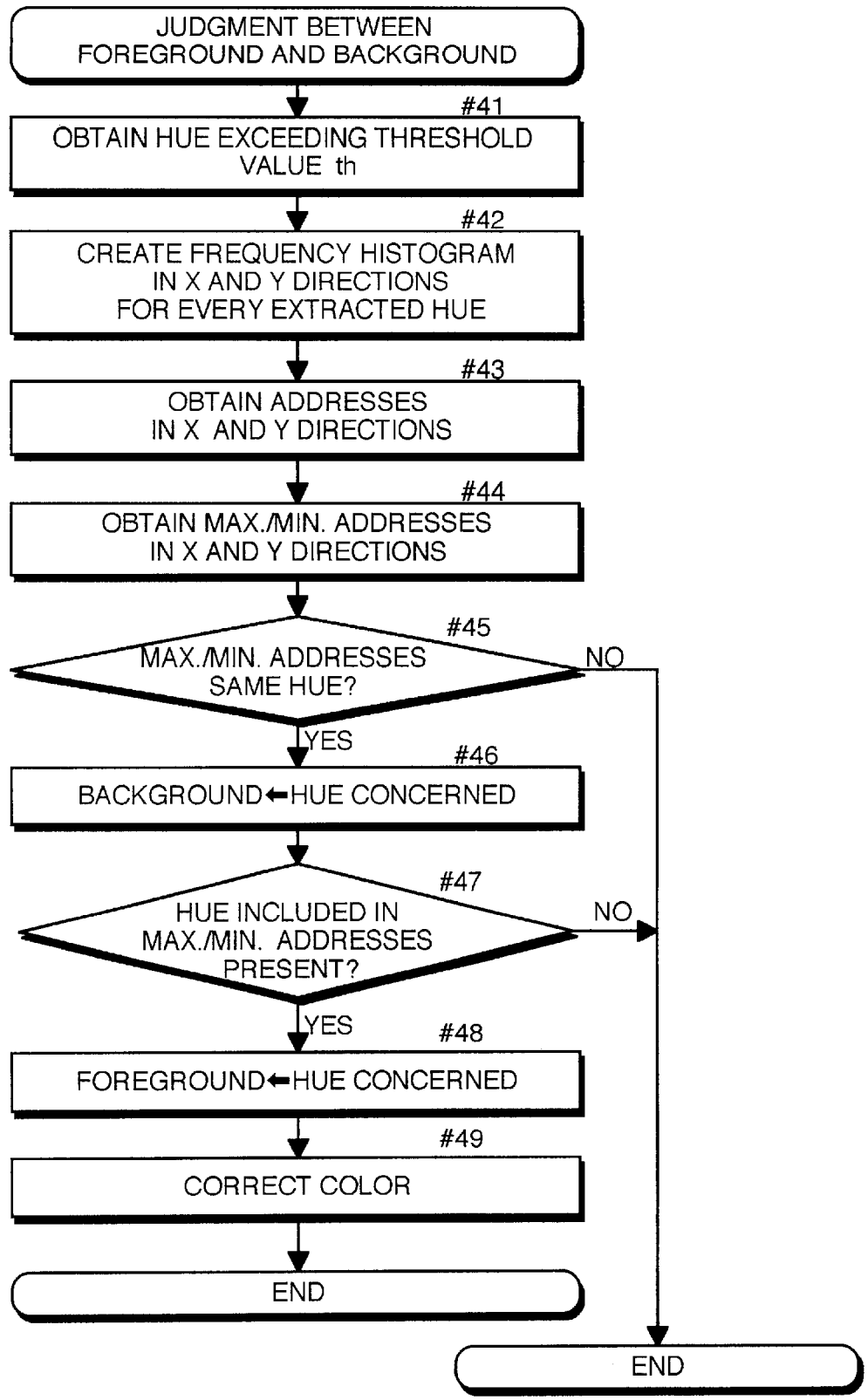
FIG. 15 is a flowchart showing a procedure of judgment processing between the foreground and background.

Next, referring to FIGS. 14 and 15, the explanation is given to a judgment method between the foreground and background. In this processing, the hue exceeding the threshold value th is first obtained from the hue histogram created in FIG. 6 (#41), and frequency histograms are created in X and Y directions of an image shown in FIG. 14 (#42). Based on said frequency histograms, addresses distributed in X and Y directions are obtained (#43), and the maximum and minimum addresses are obtained (#44). Owing to this, each of the hue distribution in the image can be grasped. Here, if the maximum and minimum addresses are the same hue, the image having said hue is decided to be a background image (#45 and #46), whereas, if there is any hue included in the maximum and minimum addresses, it is decided to be a foreground image (#47 and #48). Then, the color of this foreground image is corrected (#49). FIG. 14 shows an example of creating a frequency histogram about hue GY and B0. The hue GY is distributed in X0'–X1' and Y0'–Y1' while the hue B0 is distributed in X0–X1 and Y0–Y1. The hue B0, which is distributed outside them, is decided to be the background image, and the hue GY that is distributed inside them is decided to be the foreground image.

Next, a method for judging the solidly-shaded images is explained. The judgment about the solidly-shaded images is performed by extracting areas in which images having hue exceeding a certain threshold value continues in the predetermined number or more of pixels. FIG. 16 shows a frequency histogram of certain hue. A range of addresses X0–X1 that exceeds the threshold value is a solidly-shaded part and others are non-solidly-shaded parts. It should be noted that, even if the hue is same in an image, the image is not always the solidly-shaded part when value and chroma largely differ. Accordingly, the histograms are also created about the hue and value, and if the frequency is the threshold value or more, the area can be judged as a solidly-shaded part.

Although in the above-described embodiment, the present invention is applied to the image forming apparatus such as a digital color copier apparatus and a color printer, it can also be applied to a display unit of a digital camera or a device displaying images of a digital camera. FIG. 17 shows an entire construction of an image display system of the digital camera. A digital camera 1 is connected to an LCD (liquid crystal display) device 1000 and a printer 2000. The LCD device 1000 displays an image that is picked up by a pickup unit of the digital camera 1 in every ⅟30 second in a photographing-standby state, and can display already-photographed images that were read out from a memory card in a reproduction mode.

Figure 18:
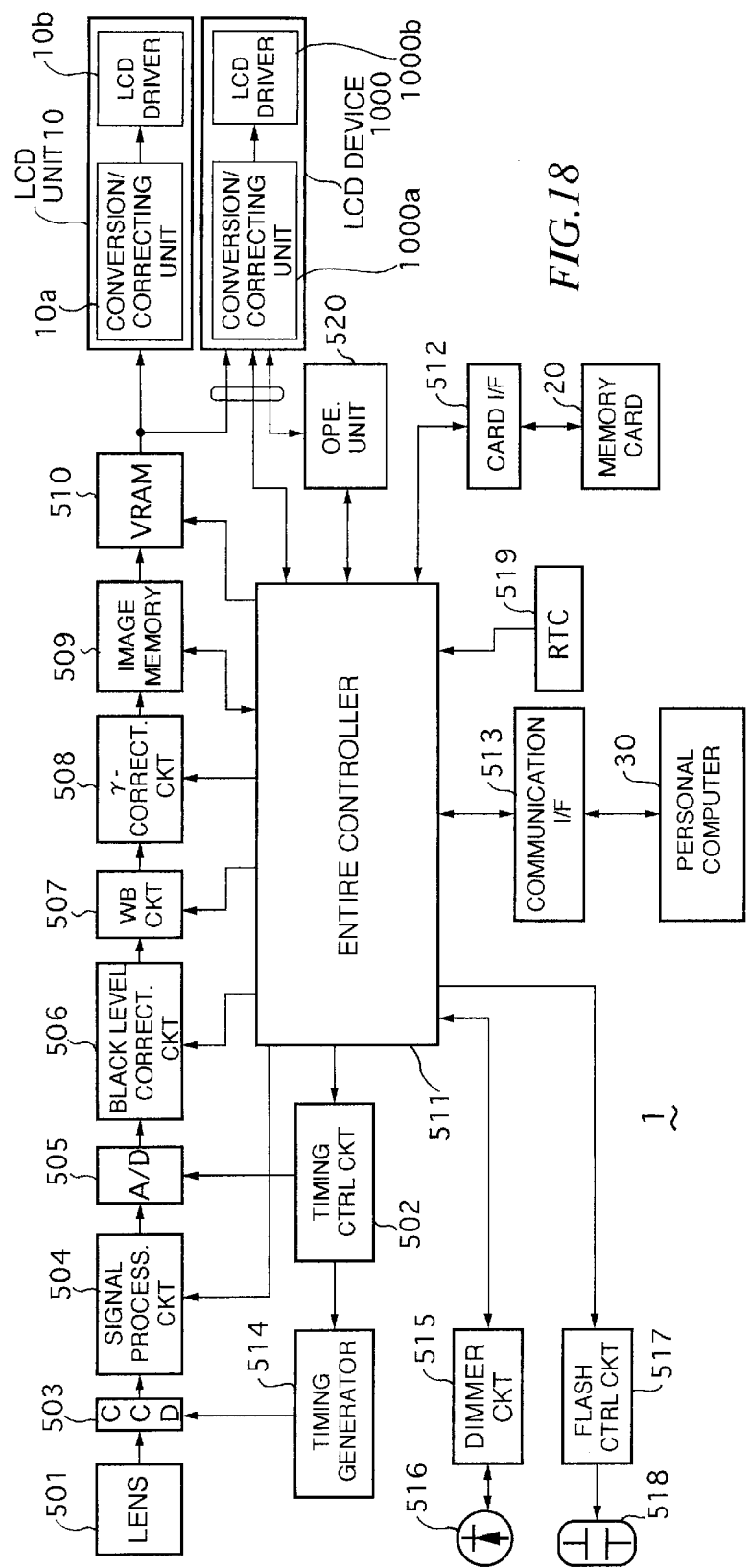
FIG. 18 is a partial block view of said system

FIG. 18 shows a block diagram of the digital camera 1 and LCD device 1000. A CCD color area sensor 503 (hereinafter referred to as sensor) which is included in the pickup unit, photoelectrically converts and outputs a pickup image of a subject that is imaged by a photographing lens 501 into an image signal composed of color elements of R(red), G(green) and B(blue).

Since the above digital camera 1 has a fixed aperture, the pickup unit carries out exposure control by adjusting an amount of exposure in the sensor 503, that is, charge accumulation time in the sensor 503, which corresponds to a shutter speed. If an appropriate shutter speed cannot be set in low subject brightness, inappropriate exposure due to the lack of the exposure is corrected by adjusting a level of the image signal output from the sensor 503. That is, the exposure is controlled in combination of the shutter speed and gain adjustment in the low brightness. The level of the image signal is adjusted in the gain adjustment in an AGC circuit of a signal processing circuit 504.

A timing generator 514 generates a driving control signals of the sensor 503 based on a reference clock transmitted from a timing control circuit 502. The timing generator 514 generates clock signals such as a timing signal of start/end of integration (start/end of exposure), a control signal for reading out a light-receiving signal of each of pixels (such as a horizontal phase-lock signal, a vertical phase-lock signal and a transmitting signal), and outputs it to the sensor 503.

The signal processing circuit 504 performs predetermined analog signal processing to the image signal (analog signal) output from the sensor 503. The signal processing circuit 504 having a CDS (correlation double sampling) circuit and an AGC (automatic gain control) circuit, decreases noises in the image signal through the CDS circuit, and adjusts the level of the image signal by adjusting gain of the AGC circuit.

A dimmer circuit 515 controls a light-emitting amount of a built-in flash 518 into a predetermined light-emitting amount that is set by an entire controller 511 in a flash photographing operation. In the flash photographing operation, subject-reflected light from flash light is received by a dimmer sensor 516 at a time of starting the exposure. When the above light-emitting amount reaches the predetermined light-emitting amount, a light emission stopping signal is output from the dimmer circuit 515 to an FL control circuit that is provided in the entire controller 511. The FL control circuit forcibly stops light emission of the built-in flash 518 according to the light emission stopping signal, thereby controlling the light-emitting amount of the built-in flash 518 to the predetermined amount.

In the camera body, the A/D converter 505 converts each of pixel signals of the image signal into a digital signal of 10 bits. The A/D converter 505 converts each of the pixel signals (analog signals) into a digital signal of 10 bits based on an A/D conversion clock input from an A/D clock generator that is not shown. The timing control circuit 502, that is controlled by the entire controller 511 generates a reference clock, and generates a clock to the timing generator 514 and A/D converter 505.

A black level correction circuit 506 corrects a black level of the pixel signals that were converted from analog to digital into a reference black level. A WB circuit 507 converts a level of the pixel data of color elements R, B and G in order that a white balance is also adjusted after γ correction. The WB circuit 507 converts the level of the pixel data of color elements R, B and G by employing a level conversion table input from the entire controller 511. It should be noted that a conversion coefficient (inclination of characteristics) of each of color elements in the level conversion table is set by the entire controller 511 in every photographed image.

A γ correction circuit 508 for correcting γ characteristics of the pixel data, has γ correction tables of e.g., six kinds which are different from each other in the γ characteristics, and executes γ correction on the pixel data with the predetermined γ correction table according to a photographed scene or a photographing condition. An image memory 509 stores the pixel data output from the γ correction circuit 508. The image memory 509 has a storage capacity of one frame, that is, a storage capacity of pixel data of n×m pixels if the sensor has pixels of n-lines×m-rows, and stores each of pixel data in a corresponding pixel position.

A VRAM 510 is a buffer memory of image data that is reproduced and displayed in the LCD unit 10 equipped in the digital camera 1. The VRAM 510 has a storage capacity of image data so as to correspond with the number of pixels of display unit 10.

In the photographing-standby state, each of pixel data of an image that was picked up by the pickup unit in every ⅟30 second, is given the predetermined signal processing by the A/D converter 504 and γ correction circuit 508, then stored in the image memory 509, and at the same time, transmitted to the VRAM 510 through the entire controller 511, and displayed on display unit 10. It should be noted that, while the number of pixels of the display unit 10 is 320×240 pixels, the VRAM itself has a storage capacity of 900 KB that is, 640×480×24 bits, and reduces the image by ½ for displaying in the display unit 10.

This allows a photographer to visually recognize a subject image through an image displayed in the display unit 10. Besides, in the reproduction mode, the image read out from the memory card 20 is given the predetermined signal processing in the entire controller 511, then transferred to the VRAM 510, thereby reproduced and displayed on the display unit 10 through the VRAM 510.

The digital camera 1 can be connected to the LCD device 1000 having a pressure-sensing touch panel of a VGA size (640×480 pixels) in an outside thereof. If it is connected, the data transferred to the VRAM 510 is also displayed on the LCD device 1000. Besides, in the reproduction mode, the image data read out from the memory card 20 is given the predetermined signal processing in the entire controller 511, then transferred to the VRAM 510, and the image is displayed on the display unit 10 and LCD device 1000 through the VRAM 510.

A card I/F 512 is an interface for writing and reading the image data in and from the image data. A communication I/F 513 is an interface in accordance with e.g., USB standards for externally connecting a personal computer 30 for communication. The flash control circuit 517 controls the light emission of the build-in flash 518. An RTC 519 is a clock circuit, and an operation unit 520 provided with various switches including a shutter button, gives operational directions to the entire controller 511.

Figure 19:
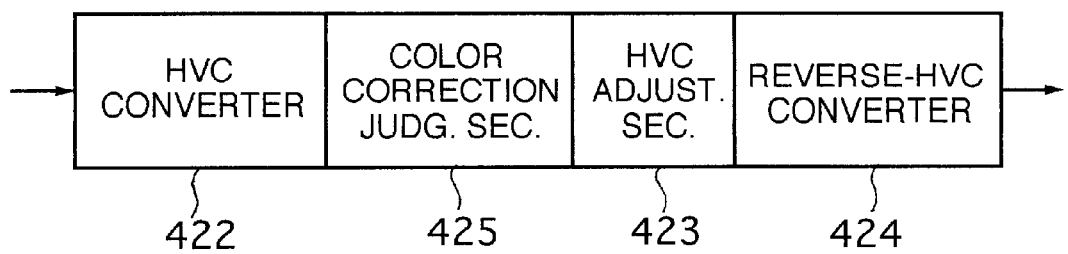
FIG. 19 is a block structural view of the color correction judgment unit.

The LCD unit 10 and LCD device 1000 that are provided in the digital camera respectively comprise an image data conversion/correcting units 10*a* and 1000*a*, and LCD drivers 10*b* and 1000*b*. As in the case of above FIG. 4, each of said image data conversion/correcting units 10*a* and 1000*a* has an HVC converter 422, a color correction judgment section 425 (extracting device and detecting device), an HVC adjusting section 423 (correction device), and a reverse-HVC converter 424, as shown in FIG. 19. This makes it possible to the equivalent corrections to those described in the above embodiment.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A color image processing apparatus which carries out processing for correcting input color image data, comprising:
   an extracting device for extracting foreground image data and background image data from the input color image data;
   a detecting device for detecting hue of the background Image data extracted by the extracting device; and
   a correcting device for correcting hue of the fore ground Image data based on the hue detected by the detecting device, wherein the correcting device carries out the correction when an area composed of the foreground color and background color exceeds a predetermined extent, and does not carry out the correction when the area is smaller than or equal to the predetermined extent.

2. The color image processing apparatus according to claim 1, wherein the correcting device corrects the hue of the foreground color in a direction of color difference of the background color.

3. The image processing apparatus according to claim 1, wherein the correcting device corrects a color contrast phenomenon that occurs visually.

4. The image processing apparatus according to claim 1, wherein the correcting device corrects the hue of the foreground color in a reverse to a direction from an actual color difference to a visual color difference by a difference between the actual color difference and the visual color difference.

5. The image processing apparatus according to claim 1, wherein the extracting device includes a generator of a histogram about the hue of a subject image, wherein, based on the histogram created by the histogram generator, each of frequency histograms about the hue is created in X and Y directions, wherein, based on the frequency histograms, addresses about the hue distributed in X and Y directions are obtained, and the maximum and minimum addresses are obtained, and wherein, if the maximum and minimum addresses are the same hue, the image having said hue is decided to be a background image, whereas if there is any hue included in the maximum and minimum addresses, the image having said hue is decided to be a foreground image.

6. A color image processing apparatus which carries out processing for correcting input color image data, comprising:
   an extracting device for extracting foreground image data and background image data from the input color image data;
   a detecting device for detecting brightness value of the background image data extracted by the extracting device; and
   a correcting device for correcting brightness value of the foreground image data based on the brightness value detected by the detecting device, wherein the correcting device carries out the correction when an area composed of the foreground color and background color exceeds a predetermined extent, and does not carry out the correction when the area is smaller than or equal to the predetermined extent.

7. The color image processing apparatus according to claim 6, wherein the correcting device corrects the brightness value of the foreground color in a direction of color difference of the background color.

8. The image processing apparatus according to claim 6, wherein the correcting device corrects a color contrast phenomenon that occurs visually.

9. The image processing apparatus according to claim 6, wherein the correcting device corrects the brightness value of the foreground color in a reverse to a direction from an actual color difference to a visual color difference by a difference between the actual color difference and the visual color difference.

10. The image processing apparatus according to claim 6, wherein the extracting device includes a generator of a histogram about the brightness value of a subject image, wherein, based on the histogram created by the histogram generator, each of frequency histograms about the brightness value is created In X and Y directions, wherein, based on the frequency histograms, addresses about the brightness value distributed in X and Y directions are obtained, and the maximum and minimum addresses are obtained,
   and wherein, if the maximum and minimum addresses are the same brightness value, the image having said brightness value is decided to be a background image, whereas if there is any brightness value included in the maximum and minimum addresses, the image having said brightness value is decided to be a foreground image.

11. A color image processing apparatus which carries out processing for correcting input color image data, comprising:
   an extracting device for extracting foreground image data and background image data from the input color image data;
   a detecting device for detecting chroma of the background Image data extracted by the extracting device; and
   a correcting device for correcting chroma of the foreground Image data based on the chroma detected by the detecting device, wherein the correcting device carries out the correction when an area composed of the foreground color and background color exceeds a predetermined extent, and does not carry out the correction when the area is smaller than or equal to the predetermined extent.

12. The color image processing apparatus according to claim 11, wherein the correcting device corrects the chroma of the foreground color in a direction of color difference of the background color.

13. The image processing apparatus according to claim 11, wherein the correcting device corrects a color contrast phenomenon that occurs visually.

14. The image processing apparatus according to claim 11, wherein the correcting device corrects the chroma of the foreground color in a reverse to a direction from an actual color difference to a visual color difference by a difference between the actual color difference and the visual color difference.

15. The image processing apparatus according to claim 11, wherein the extracting device includes a generator of a histogram about the chroma of a subject image, wherein, based on the histogram created by the histogram generator, each of frequency histograms about the chroma is created in X and Y directions, wherein, based on the frequency histograms, addresses about the chroma distributed in X and Y directions, are obtained, and the maximum and minimum addresses are obtained, and wherein, if the maximum and minimum addresses are the same chroma, the Image having said chroma is decided to be a background image, whereas if there is any chroma included in the maximum and minimum addresses, the image having said chroma is decided to be a foreground image.

16. A method of image processing for correcting input color Image data, comprising steps of:
   (a) extracting foreground Image data and background Image data from the input color image data;
   (b) detecting one or more among hue, brightness value and chroma of the background image data extracted in the step (a); and
   (c) correcting one or more among hue, brightness value and chroma of the foreground image data based on the one or more among the hue, brightness value and chroma detected in the step (b), wherein the correction is carried out when an area composed of the foreground color and background color exceeds a predetermined extent, and the correction is not carried out when the area is smaller than or equal to the predetermined extent.

17. A program for use in conjunction with a computer system, the program comprising steps of:
   (a) extracting foreground Image data and background Image data from the input color image data;
   (b) detecting one or more among hue, brightness value and chroma of the background image data extracted in the step (a); and
   (c) correcting one or more among hue, brightness value and chroma of the foreground image data based on one or more among the hue, brightness value and chroma detected in the step (b), wherein the correction is carried out when an area composed of the foreground color and background color exceeds a predetermined extent, and the correction is not carried out when the area is smaller than or equal to the predetermined extent.

18. A color image processing apparatus which carries out processing for correcting input color image data, comprising:
   extracting means for extracting foreground image data and background image data from the input color image data;
   detecting means for detecting one or more among hue, brightness value and chroma of the background image data extracted by the extracting means; and
   correcting means for correcting one or more among hue, brightness value and chroma of the foreground image data based on one or more among the hue, brightness value and chroma detected by the detecting means, wherein the correction is carried out when an area composed of the foreground color and background color exceeds a predetermined extent, and the correction is not carried out when the area is smaller than or equal to the predetermined extent.

* * * * *